United States Patent [19]

Luyten

[11] Patent Number: 4,944,339

[45] Date of Patent: Jul. 31, 1990

[54] PROCEDURE FOR MACHINING WOODEN ARTICLES, INSTALLATION FOR CARRYING OUT A PROCEDURE OF THIS TYPE AND CLAMPING BENCH TO BE USED IN AN INSTALLATION OF THIS TYPE

[75] Inventor: Jacobus H. Luyten, Tegelen, Netherlands

[73] Assignee: Helma Tegelen B. V., Netherlands

[21] Appl. No.: 329,951

[22] Filed: Mar. 29, 1989

[30] Foreign Application Priority Data

Mar. 30, 1988 [NL] Netherlands .......................... 8800814

[51] Int. Cl.$^5$ ............................. B27B 1/00; B27C 5/00
[52] U.S. Cl. ..................................... 144/363; 29/33 P;
29/563; 144/134 R; 144/3 R; 144/137;
144/142; 144/144 R; 144/245 A; 144/371;
144/372; 144/154; 198/465.1; 269/55; 269/56;
409/158
[58] Field of Search .............. 144/3 R, 3 A, 3 B, 3 C,
144/134 R, 137, 144 R, 144 A, 1 R, 245 R, 245
A, 245 B, 307, 308, 363, 371, 372, 142, 154;
409/158; 29/33 P, 563; 198/345, 465.1, 465.3;
269/55, 56

[56] References Cited

U.S. PATENT DOCUMENTS 1,577,744  3/1926  Gould et al. .
2,948,897  8/1960  Sherwood .
3,215,175  11/1965  Hibner .
3,295,570  1/1967  Olbrich .
3,814,153  6/1974  Schmidt .......................... 144/134 R
3,865,162  2/1975  Schmidt .......................... 144/144 R
4,260,001  4/1981  De Muynck .................... 144/144 R
4,410,025  10/1983  Sicotte .

FOREIGN PATENT DOCUMENTS 1453209  11/1964  Fed. Rep. of Germany .
2481679  11/1981  France .

Primary Examiner—W. Donald Bray
Attorney, Agent, or Firm—Michael N. Meller

[57] ABSTRACT

Described is a procedure for machining wooden articles in which a plurality of machining operations is carried out on a wooden article in a series of machining operation stations.

The wooden articles are transported along the series of machining operation stations whereby each article remains fixed on one and the same clamping bench during all operations; following each operation the bench is moved to the next station while the wooden article remains clamped thereon.

During moving the clamping is carried out with clamping devices which can move synchronously with the clamping benches; in a station a clamping bench is fixed and the clamping action may be achieved either by stationary clamping devices connected to a station or the clamping devices which can move with a bench.

Also is described an installation for carrying out the procedure.

15 Claims, 4 Drawing Sheets

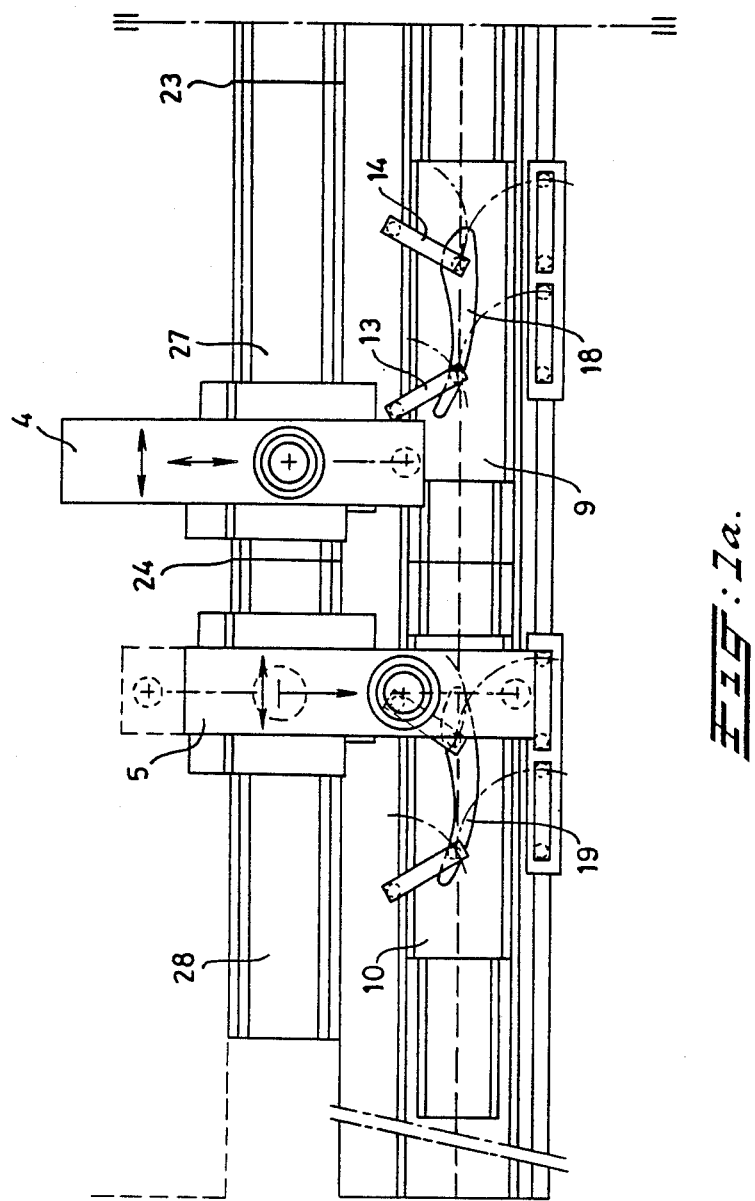

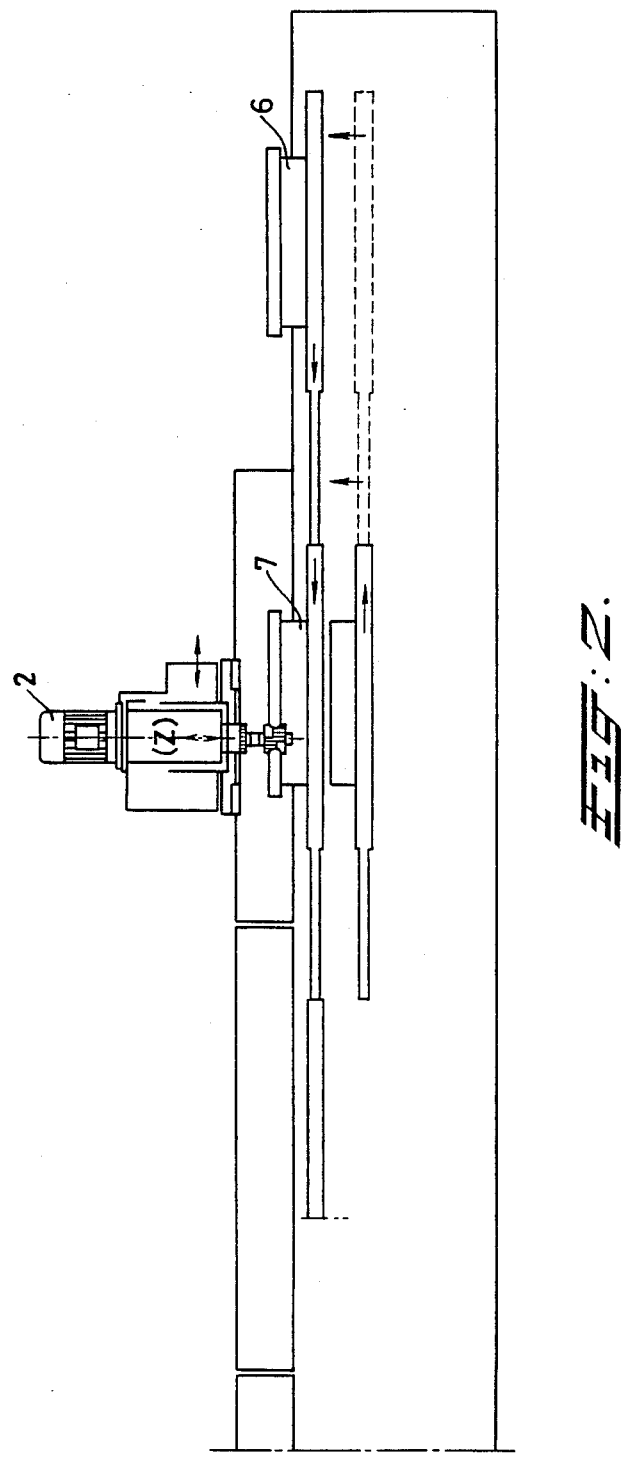

PROCEDURE FOR MACHINING WOODEN ARTICLES, INSTALLATION FOR CARRYING OUT A PROCEDURE OF THIS TYPE AND CLAMPING BENCH TO BE USED IN AN INSTALLATION OF THIS TYPE

BACKGROUND OF THE INVENTION

The invention relates primarily to a procedure for machining one or more wooden articles, in order to proceed from an initial shape to a final shape, wherein:

each wooden article is subjected to a series of successive machining operations, each machining operation takes place in a machining operation station which contains machining tools, while during each machining operation the wooden article is held firmly on a clamping bench with the aid of mechanical clamping devices, and the article is removed from the particular station at the end of each machining operation.

Procedures for machining wood are generally known. Thus, Netherlands Patent No. 104 722 describes a so-called tenoning machine wherein a procedure is carried out with which an article is provided with a projecting tenon in a number of steps.

The steps of the procedure are such that the part of the wooden article which does not form part of the tenon is removed, for example by means of milling, so that finally the wooden article with the tenon shaped by milling remains. Other types of machining which arise in the woodworking industry, such as, for example, for furniture are, for example, cut-down and cut-up milling. These terms signify the shaping, by means of milling, of a recess in or, respectively, relief on the surface of the wooden part, which takes place when shaping arm rests and table and chair legs. Another type of machining can be the sanding of the wooden part. Yet another type of machining can be the shaping of so-called punched or slotted holes. All of these machining operations have up to now been carried out in separately set-up installations, a wooden article being clamped in a first installation and subjected to an initial machining. The wooden article was then removed and clamped in a second installation and machined etc. until after machining in all installations a final shape of the wooden article was achieved. The continual re-clamping of the wooden articles to be machined is extremely time-consuming and certainly uneconomic compared with the machining time per machining operation step. The machining speed of wooden articles is relatively high, i.e. the clamping time per wooden article is approximately the same as the machining operation time. Attempts have been made to increase the time effectivenss by machining several articles at the same time per machining step; however, this method has resulted in little time advantage in view of the fact that a total clamping time is still always expended per wooden part which is approximately equal to the clamping time per machining operation×the number of machining operations.

SUMMARY OF THE INVENTION

The present invention has the aim of providing a solution for the above-mentioned disadvantage and relates to a procedure of the type indicated above, which procedure is characterized in that the machining operations are carried out successively in a series of machining operation stations and in that a wooden article remains clamped in one and the same clamping bench for undergoing all machining operations, the bench being moved between the machining operations and being fixed successively in each of the machining operation stations of the series, after which machining takes place, and the article is removed from its clamping bench after having passed through all machining operations in all stations.

As a result of the fact that each article to be machined is positioned only once on one clamping bench while at the end of each machining operation a movement is made between the particular clamping bench and the particular machining operation station, a great saving in time is obtained which is of the order of magnitude of (the number of machining operation steps−1)×the clamping time per wooden part.

After removing the wooden article from its clamping bench, the article can be transported or returned to a department for intermediate treatment or check.

When carrying out the procedure according to the present invention a wooden article to be machined is therefore always clamped on the same clamping bench, while the wooden article is at all times kept in the same position relative to the particular clamping bench by means of suitable clamping devices. When changing the clamping devices used, the procedure is always such that in a first step the new clamping devices to be used are brought into clamping contact with the article to be clamped and that the clamping devices previously used are then removed.

In particular, in the procedure according to the invention for clamping a wooden article on a clamping bench in a machining operation station use is made of clamping devices which can be coupled and which can move with the clamping bench and/or stationary clamping devices connected to the machining operation station.

In a machining operation station a choice will have to be made, in connection with the machining to be carried out from the various available clamping devices; however, in all cases care will be taken that the wooden article to be machined continues to assume a fixed position relative to its own clamping bench. By virtue of the fact that a clamping bench is fixed in a machining operation station relative to the machining operation station, a fixed position of the wooden article relative to the machining station is thus also ensured.

Of course, several articles to be machined can be present on each clamping bench, all of which are machined in one machining operation station before moving the clamping bench from a fixed position in one machining operation station to a fixed position in another machining operation station.

The procedure according to the invention is appropriately practiced in such a way that during the movement of a clamping bench between the machining operation, a wooden article is clamped with the aid of the clamping devices which can be coupled and moved with the clamping bench. After arrival and fixing of a clamping bench in a machining operation station, the clamping of the wooden article is taken over by one or more other stationary clamping devices connected to the machining operation station, the clamping devices which can be coupled and move with the bench are detached and returned to the previous machining operation station and machining operations are carried out on the wooden article on the clamping bench before and-/or after the clamping is taken over.

If appropriate, the clamping devices which can be coupled can also be incorporated in an endless conveyor system so that they always move in the same direction as the benches.

Advantageously, after the end of each machining operation and the subsequent movement of the clamping bench, a new clamping bench with a new wooden article clamped thereon is fed to the first machining operation station and, if such is present, a clamping bench with the machined wooden article clamped thereon is removed from the final machining operation station, while, if more than one clamping bench is present, all of the machining operations, corresponding in number to the number of clamping benches, are first completed before the clamping benches are moved.

The above indicates that by supplying a new clamping bench with an unmachined article or unmachined articles to the first station after each machining operation (or series of machining operations in one and the same station) and, if after some time clamping benches provided with one or more wooden articles are present in all stations, removing a clamping bench from the last station, a continuous process can be realised.

Highly advantageously all of the machining operations belonging to a series proceed essentially simultaneously, the time taken for each of the machining operations being at least equal to the time taken for the most time-consuming machining operations or series of identical machining operations, if several articles are clamped on one bench.

Very highly advantageously the machining operations are adjusted such that they all take approximately the same period of time. The significance of this measure is that if a series of machining operations includes one machining operation which is particularly time-consuming compared with the other machining operations, this long machining operation can be broken down to give a larger number of machining operations which take a time which better corresponds to the time taken by the other machining operations. However, it is not necessary to break down one or more very long machining operations into a larger number of shorter machining operations in this way.

The invention also relates to an installation for the machining of one or more wooden articles and made up of several machining operation stations, each station consisting, during its functioning, of at least:

a clamping bench with clamping devices for clamping and positioning one or more identical wooden articles to be machined, machining tools, and driving and control devices for the machining tools, in which the clamping devices consist of stationary clamping devices which are fixed in position relative to a machining operation station and clamping devices which can be coupled to the clamping bench and can move with the clamping bench; the installation comprises devices for the synchronous movement of each of the clamping benches from a fixed position relative to a machining operation station to a fixed position relative to another machining operation station and means are present for actuating the various clamping devices as desired in a machining operation station, but such that one or more clamping devices continuously exert their clamping action on the wooden article, and in that clamping bench fixing devices are present for fixing a clamping bench in a machining operation station.

The installation according to the invention thus contains different types of clamping devices, some of which are firmly connected to a machining operation station while others are coupled to a clamping bench for transport and move with this bench from one machining operation station to another machining operation station and return again after clamping has been taken over by the stationary clamping devices connected to the other station. The means for moving the clamping benches can be of many types; as will be indicated below, these moving devices can consist, for example, of an endless belt.

With movements of this type, however, it is important that a very accurate positioning is achieved relative to a machining operation station in which a machining operation has to be carried out. Highly accurate positioning of this type can be achieved very well with the aid of mechanical and/or electronic devices.

In order to make parts of the wooden article which are to be machined in a machining operation station optimally accessible, a choice can be made from, the clamping devices to be used in a machining operation station. Use can be made of the devices firmly connected to the machining operation station or of the clamping devices which move with the clamping benches from one machining operation station to the other. At all times, however, the wooden article will be kept in a fixed position relative to its clamping bench by clamping devices. After a clamping bench has been moved to an accurate position relative to another machining operation station, provision is made for fixing of the clamping bench, with the wooden article located thereon, relative to the machining operation station. Many possibilities are also available to those skilled in the art for a fixing of this type; mechanical fixing or fixing with electromagnetic devices can be considered.

In the installation according to the invention, the clamping benches are, in particular, detachably mounted in a clamping bench conveyor system. At the end of each series of machining operations, the conveyor devices are actuated, by which means the clamping benches move up one position relative to the machining operation stations.

The conveyor system can be constituted by, for example, an endless belt or a combination of conveyor systems which can transfer clamping benches to one another.

Advantageously, there are more clamping benches than machining operation stations, while the machining operation stations are set up in a line and devices are provided for recirculating the clamping benches. With this embodiment of the installation according to the invention a machining line is envisaged in which the machining operation stations are set up in a fixed position relative to one another and a clamping bench conveyor system moves the benches up one place relative to the machining stations at the end of each machining operation. At the end of the machining series, the benches are freed from the wooden articles clamped thereon, for example by means of a robot, after which the benches are returned to the start of the line.

The clamping benches with the machined parts can also be returned to the line operator for checking or for another treatment.

In another highly advantageous embodiment of the installation according to the invention, the clamping benches are fitted on the surface of a rotary drum, while the machining operation stations are placed in fixed positions relative to the drum surface and the axis of the drum is horizontal. This embodiment is particularly attractive because of the small floor area which will be taken up by an installation of this type.

In this case also the machining operation stations are fixed in position relative to one another; at the end of each machining operation the drum is turned, so that the clamping benches move up one place relative to the machining operation stations.

It is pointed out that an embodiment is also possible within the scope of the invention in which the clamping benches are fitted on a disc-shaped bench with a vertical axis and the machining stations are fitted above the surface of the disc.

With regard to the control devices for the machining tools it may be mentioned that in the installation according to the invention these control devices can be constituted by mechanical scanning elements which are coupled to the machining operation tool and scan a jig with the desired final shape of the wooden article.

Very advantageously, however, the control devices are constituted by elements with an X-Y-Z movement function which, with the aid of an electronic control element, can transmit a programmed movement to the machining tool in each machining operation station, which movement takes place in accordance with the desired final shape. This last possibility is very attractive since the expensive production of jigs to be scanned can be entirely dispensed with. The computer associated with a system of this type is simple to program by scanning the final shape of a wooden article, produced once in a conventional manner, with the aid of a programmer scanner in order to store in the memory of the computer the geometrical and positioning data of the article to be machined. In the case of geometrical figures such as straight lines, circles and other geometrical figures with a fixed mathematical relationship, programming is very simple. In these cases establishing the start and finish coordinates of the movement will frequently suffice to specify the movement program, which, of course, makes the size of the computer memory required considerably smaller.

Very advantageously use can likewise be made of computer control for control of the movement of the clamping bench conveyor system and for control of the clamping bench fixing in the machining operation stations and for control of the actuation of the clamping devices. A computer control of this type will in general operate via a suitable interface, is generally known and requires no further discussion here.

When employing the procedure according to the invention and using an installation according to the invention, the following advantages are obtained:

1. No jigs are necessary; no costs are incurred for the production, storage and maintenance of these and it is cost-effective to automate the manufacture of small series of products.

2. The workpiece is stationary during machining, as a result of which it is possible to permit more "daring" shaping and to bore holes on separate boring stations, both circular and slotted holes and with variation in breadth and depth, always with only the one tool.

3. All products are identical; high reproducibility by absolute control.

4. Tool correction is possible in the case of wear; this also makes it possible to make small corrections to the shape of the workpiece without modifying the program.

5. The feed speed is continuously variable; control is from the program.

6. There is a possibility of carrying out some "routing designs" on the top of the workpiece.

7. The workpiece can be machined all round, both in line and stationary. The mechanical clamping system used permits heavy machining to be carried out.

8. Short throughput time of materials and semi-finished products with less chance of movement of the material, and a saving in space.

9. As a result of a combination of machining operations in one machine, less internal transport; production will be easier to oversee.

10. As a result of the precision of the workpieces, less lost time during subsequent assembly.

11. The machines will also be usable "separately" and thus can also be used as conventional machines.

12. As a result of the "line" arrangement of the stations, a high accessibility of the machine for adjusting work and maintenance.

13. By virtue of module construction expansion always possible, even by intermediate positioning of stations.

Finally, the invention is embodied in a clamping bench which can be used in the installation according to the invention, which clamping bench is provided with devices which make a detachable fixing in a conveyor system possible. A fixing of this type can be mechanical; vacuum fixing devices or electromagnetic fixing devices are particularly advantageous. The further shortening of the total machining time for the wooden articles is obtained by using these clamping benches which can be fixed rapidly in the conveyor system.

When all clamping benches remain fixed, each machining operation station can be used independently as a stationary machining centre.

It is also pointed out that the procedure according to the invention and the installation in which this procedure is carried out do not have to be restricted to a single series of moving clamping benches with wooden articles affixed thereon. Each machining operation station can also be designed with two machining heads, each of which carries out identical machining on an identical wooden article clamped on a separate clamping bench.

A central clamping bench in a fixed position can also be considered for large articles to be machined, one article being located on the bench. Movable machining stations which are programmed such that machining is carried out on either side of the article can then be set up on either side of the clamping bench.

BRIEF DESCRIPTION OF THE DRAWINGS

The invention will now be illustrated with the aid of the drawing, in which:

FIGS. 1a and 1b show schematic top views of the installation according to the invention, FIG. 2 shows a schematic side view of part of the installation from FIG. 1.

In FIG. 1, 1 shows a loading installation in the installation according to the invention, while 2, 3, 4 and 5 represent machining tools set up in machining operation stations. As indicated, the machining tool in this case has an X-Y-Z-control. The movement in the Y direction is limited to a specific region for each of the tools, as indicated by lines 22, 23 and 24.

Figure 1B:
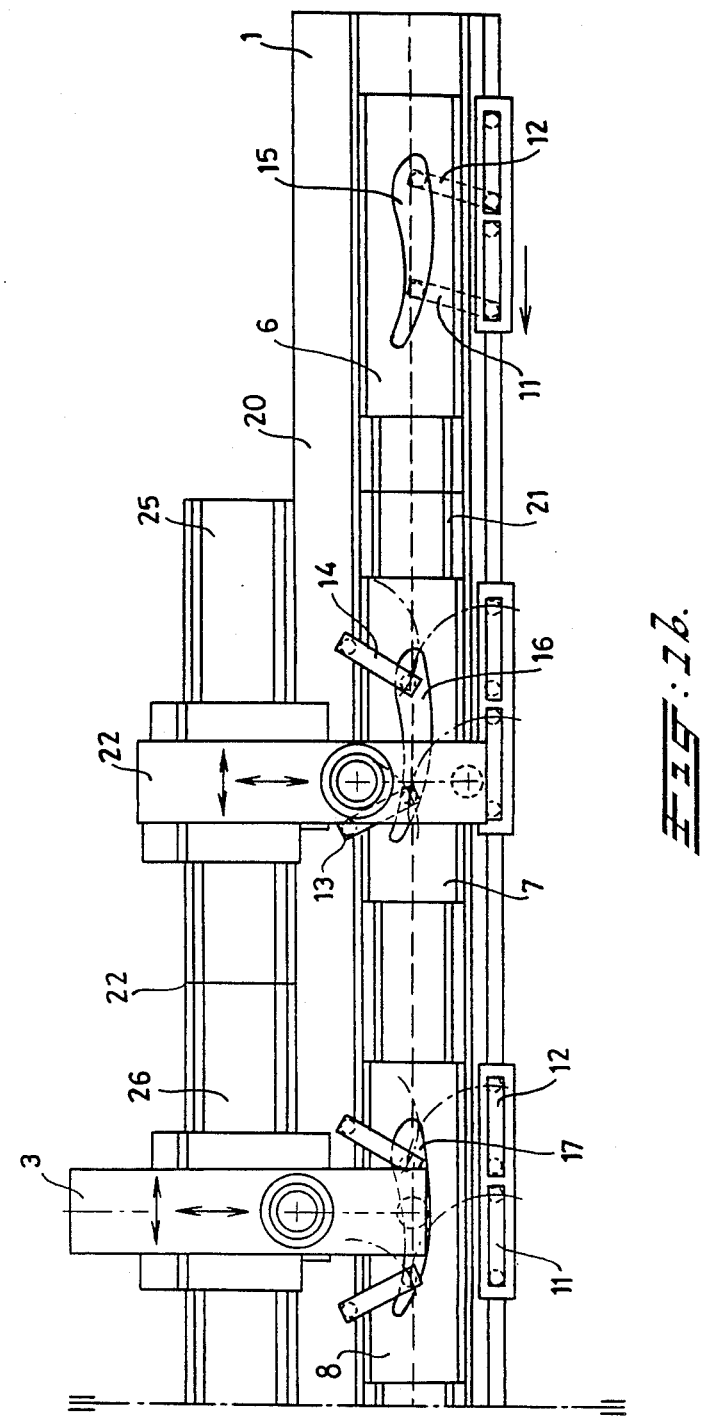

On the right of the Figure it can be seen that a wooden article 15 is clamped on bench 6 with the aid of clamping devices 11 and 12 in loading installation 1.

The machining tool 2 is machining wooden article 16, which is on bench 7 and is clamped with the aid of clamping devices 13 and 14. Likewise, the machining tool 3 is machining wooden article 17, which is located on clamping bench 8 and is clamped with the clamping devices drawn there, which in terms of position and function correspond to the above-mentioned clamping devices 13 and 14.

When the machining operations with tools 2, 3, 4 and 5 are complete, the clamping devices, which correspond to 11 and 12 for clamping bench 6, are actuated in said machining stations in order to contact the wooden article and clamp this, after which the clamping devices 13 and 14 are then removed. The clamping benches with the clamping devices 11 and 12 can now be transported so that wooden article 15 comes to lie by machining tool 2 and that wooden article 16 comes to lie by machining tool 3, etc. On arrival, the clamping benches 6, 7, 8 and 9 are first fixed relative to the respective machining operation stations 25, 26, 27 and 28, after which, depending on the machining to be carried out, the clamping devices 11 and 12 are maintained in contact with the wooden article or the stationary clamping devices corresponding to 13 and 14 are applied, after which the clamping devices corresponding to 11 and 12 can be de-coupled. In the design of the installation sketched here, the article to be machined in such that a machining can take place in the respective machining operation stations while the clamping devices corresponding to 11, 12, 13 and 14 are functioning.

In a frequently employed embodiment of the procedure, a machining operation is first carried out with clamping devices which can be coupled in the coupled position and the stationary clamping devices are then brought to the clamping position and subsequently the clamping devices which can be coupled are de-coupled and moved back to the previous station. A further machining is then carried out in the same station.

The installation sketched here shows, per clamping plate, two clamping devices 11 and 12, which can be coupled and move with the clamping plate, and also two stationary clamping devices 13 and 14 connected to each machining operation station. Of course, the number and the shape of the types of clamping devices sketched here can be varied at will and the installation can also be designed such that several identical articles can be clamped per clamping bench.

Part of the installation from FIG. 1 is shown schematically in FIG. 2 and an impression is gained of the system with which the clamping benches are transported. It is indicated in the drawing that the clamping benches are transported horizontally and that clamping benches are transferred from one conveying system to the other at the start and end of the installation. During machining, which takes place with the aid of the machining tool 2, the clamping bench 6 can be provided with a wooden article to be machined, the control unit of the total installation being designed such that clamping devices 11 and 12 located at clamping bench 6 can be operated manually independently of the functioning of the remaining part of the installation. At the end of the machining line, the wooden articles are removed from the clamps, for example with the aid of a robot or with the clamping bench returned to the line operator for checking or further machining.

Figure 3:
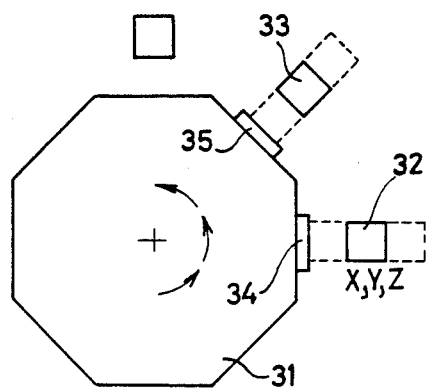
FIG. 3 shows a schematic side view of a variant of the installation according to the invention.

FIG. 3 indicates that, in connection with space-saving, an installation according to the invention can be designed as, for example, a multi-angle drum 31 the shaft of which is horizontal. In this case clamping devices of the two types previously described are located on the surfaces of the multi-angle drum, while it is indicated schematically that wooden articles 34 and 35 can be machined by machining tools 32 and 33, which have an X-Y-Z-control.

Figure 4:
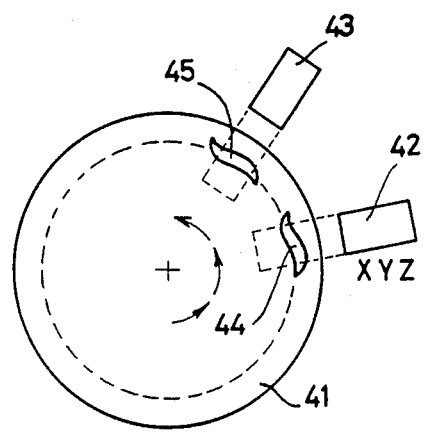
FIG. 4 shows a schematic top view of a variant of the installation according to the invention.

FIG. 4 also shows schematically that the wooden articles to be machined can also be located on a disc-shaped support 41 which can be rotated step-wise and on which clamping benches with the two types of clamping devices previously described are located. The machining tools 42 and 43 are again of the X-Y-Z-controlled type.

In installations according to the invention, a number of embodiments of which has been described with the aid of the Figures, a choice can be made from the conventionally used actuating means, such as pneumatic, hydraulic and electrical actuation, for the actuation of the clamping devices which can be coupled and move with a clamping bench and for the stationary clamping devices.

Where in the foregoing description the term clamping bench is used this term may, with equal meaning, be read as clamping table.

What is claimed is:

1. Apparatus for machining one or more wooden articles from an initial shape to a final shape at a plurality of machining operation stations comprising:
    a plurality of clamping benches, each so said benches being respectively adapted to support a wooden article to be machined and including at least one first clamping device mounted thereon for fixedly clamping its respective wooden article;
    a conveyor arrangement for supporting said plurality of clamping benches and moving them along a predetermined path past said plurality of machining operation stations so that the wooden article supported on each clamping bench can be machined at each machining operation station in sequence;
    a plurality of second clamping devices, at least one of said second clamping devices being respectively mounted at each of said plurality of machining operation stations and being adapted to fixedly clamp said wooden article mounted on said clamping bench when each clamping bench reaches its respective machining operation station whereby said wooden article remains fixedly mounted on its respective clamping bench until all of the machining operations to be carried out on said article from its initial shape to its final shape have been completed, said first clamping devices being used to support said wooden article at least during movement of said clamping benches between stations.

2. Apparatus as claimed in claim 1 wherein each of said first clamping devices is transportable with its respective clamping bench and each of said second clamping devices is stationary at its respective machining operation station.

3. Apparatus according to claim 1 wherein said first clamping devices can be coupled back from one machining operation station to previous machining operation station.

4. Apparatus according to claim 1 wherein said clamping benches are detachably fixed to said conveyor arrangement.

5. Apparatus according to claim 4, wherein there are more clamping benches than machining operation stations and said machining operation stations are set up in a line, said clamping benches being recirculated.

6. Apparatus according to claim 4, wherein said clamping benches are mounted on the surface of a rotary drum and said machining operation stations are placed in fixed positions relative to the drum surface, the drum axis being horizontal.

7. Apparatus according to claim 15 wherein said clamping bench is mounted by vacuum fixing devices.

8. Apparatus according to claim 15 wehrein said clamping bench is mounted by electromagnetic fixing devices.

9. Procedure for machining one or more wooden articles in order to proceed from an initial shape to a final shape, comprising:
the first step of mounting said wooden article on a clamping bench by at least one first clamping device;
the second step of moving said clamping bench with said wooden article fixedly mounted thereon by said first clamping device to a machining operation station;
the third step of clamping said wooden article on said clamping bench at said machining operation station by at least one second clamping device located at said station;
the fourth step of subjecting said wooden article to a machining operation at said station;
the fifth step of unclamping said second clamping device at said station; and
repeating said second through fifth steps at a plurality of machining operation stations until said wooden article has proceeded from its initial shape to its final shape.

10. The procedure as claimed in claim 9 wherein said first clamping device is unclamped from said wooden article between said third and fourth steps.

11. The procedure as claimed in claim 10 wherein said wooden article is again clamped by said first clamping device between said fourth and fifth steps.

12. The procedure as claimed in claim 10 wherein said unclamped first clamping device is moved back to a previous machining operation after said third step.

13. Procedure according to claim 9, wherein after the end of the fourth step and synchronously with the subsequent movement of the clamping bench,
a new clamping bench with a new wooden article, having its initial shape, clamped thereon is fed to the first machining operation station, and
if such is present, a clamping bench with the machined wooden article having its final shape, clamped thereon is removed from the final machining operation station,
while, if more than one clamping bench is present, all of the machining operations, corresponding in number to the number of clamping benches, are first completed before the clamping benches are moved.

14. Procedure according to claim 13, in which all machining operations belonging to a series essentially proceed simultaneously on an equal number of different wooden articles and the time for which a clamping bench remains in a machining operation station is at least equal to the time taken for the most time-consuming machining operation.

15. Procedure according to claim 14, in which the machining operations are set such that they all take an approximately equal length of time.

* * * * *